United States Patent Office 2,932,632
Patented Apr. 12, 1960

1

2,932,632

PREPARATION OF POLYETHYLENE HAVING IMPROVED PROCESSABILITY

Arthur W. Barry and William M. D. Bryant, Wilmington, Del., assignors to E. I. du Pont de Nemours and Company, Wilmington, Del., a corporation of Delaware No Drawing. Application October 21, 1953
Serial No. 387,511

6 Claims. (Cl. 260—94.9)

This invention relates to a process for the polymerization of monoolefins and more particularly to a process for the polymerization of ethylene to normally solid polymers having improved processability and to the polymers so produced.

There are a number of processes described in the art for the polymerization of olefins with the principal objective of obtaining high molecular weight polymers for various purposes. By the use of acidic type catalysts olefins have been polymerized to products of relatively low molecular weight and of an oily nature. With catalysts that generate free radicals a distinctly different polymeric product is obtained, varying in consistency from a semisolid to a hard, tough, horny material. The preparation of the normally solid high molecular weight polymers of ethylene has usually involved the use of superatmospheric pressures and elevated temperatures, although with highly active catalysts that provide free radicals at low temperatures these products have been produced at comparatively low temperatures and moderate pressures.

On the domestic market today there are offered a range of polymeric products from olefins, and especially ethylene, having densities varying from 0.910 to 0.930, with a wide range of molecular weights. While the difference in these densities is numerically not great, nevertheless the differences in the physical as well as chemical properties of the polymers from the minimum density polymer to the maximum density polymer is quite extensive due to polymers of the same densities often having different molecular weights. While the density and/or molecular weight of the normally solid polymers of ethylene gives some indication of what properties are to be expected in that polymer, nevertheless the industrial arts of today require a more exacting measure of a polymer's utility. For example, in the extrusion and wire coating industries density is of lesser importance than processability which may be measured by extrudability or draw rate of the polymer, e.g., the rate a polymer can be extruded as an unsupported film. The invention is directed to the production of a polymer from ethylene that has superior processability.

An object of the present invention is to provide a process for the polymerization of olefins which permits accurate control of the reaction and polymers produced. Another object is to provide a process for the preparation of normally solid polymers from the monoolefins and more particularly ethylene, wherein the olefin is catalyzed by a free radical producing catalyst in the presence of reactants and saturated hydrocarbons to produce a polymer of ethylene together with derivatives thereof, which have superior processability and chemical properties. A further object of the invention is to provide a suitable reaction environment wherein ethylene can be polymerized and reacted simultaneously to give homopolymers and derivatives thereof. Still another object is to provide new polymers than can be produced by simultaneously polymerizing ethylene with and while forming derivatives of its homopolymers. Other objects and advantages of the invention will hereinafter appear.

2

The above and other objects are realized in accord with the invention by a process which produces polymeric products from ethylene having improved processability, density, stiffness, yield point, film draw, tear strength and other physical properties which peculiarly fit them for use in industry. Commercial homopolymers of ethylene now available do not have the aforesaid properties to the desired extent. It has been found in accord with the invention that if polymers of ethylene are mixed with or preferably formed simultaneously with the formation of a polyethylene alkane and the resulting composite polymeric product has from about 10 to 90 parts by weight of the 2-polyethylene alkane per 100 parts, that product has in large measure the improved processability and physical characteristics that peculiarly adapt it for use in extrusion and like processes.

Preferably the composite polymer is prepared by a polymerization reaction conducted substantially in accord with the well-known processes for the preparation of ethylene homopolymers, preferably operated under certain temperature, pressure and catalyst conditions such that the desired proportion of the 2-polyethylene alkane is produced simultaneously with the production of the ethylene homopolymer. Hydrocarbons containing 1 to 4 carbon atoms combine under ethylene polymerization conditions to form simultaneously with the formation of ethylene homopolymers, polyethylene substituted alkanes, these substituted alkanes being produced in amounts determined by the ratio of the alkane to ethylene present. The production of a composite polymer having a filament draw rate of at least 50 feet per minute, which rate will be more fully described hereinafter has superior processability and requires the presence of up to 50% of a 2 polyethylene alkane based on the total weight of polymer, although it may be present to the extent of 90% or more.

Processability as measured by the draw rate in feet per minute is a characteristic of the composite polymer and is determined by a multiplicity of factors. Normal homopolymers of ethylene compared with 2-polyethylene alkane synthesized under the same conditions do not have superior processability together with concomitant desired physical properties. According to the teachings of the art the skilled chemist, cognizant of the polymerization of ethylene, would expect that by lowersible to produce a polymer of ethylene having improved stiffness and greater density over that produced at higher temperatures. Along with these improved properties, however, there would result an increase in molecular weight of the polymer. This increase in molecular weight decreases processability with the result that instead of producing a polymer having the desired improved processability a polymer would be produced having decreased processability. By, however, conducting the polymerization in accord with the process of the invention and in the presence of prescribed amounts of an alkane, it is possible to produce a composite polymer without substantial increase in molecular weight.

More specifically, the polymeric product of the invention is prepared by a process in which ethylene and the selected hydrocarbon are reacted and the ethylene polymerized at a temperature between about 140 and 250° C., under a pressure of 800 to 2000 atmospheres and in the presence of a suitable ethylene polymerization catalyst. The hydrocarbon is present in definite proportions in order to provide the required amount of the 2-polyethylene alkane to give the desired composite polymer with its superior properties.

The saturated hydrocarbons which can be employed for preparing the preferred composite polymer of the invention must be present during the polymerization in the proper proportions. With methane it is necessary to use between 18% and 90% of this saturated hydrocarbon based on the weight of ethylene present. With ethane from 6% to 40% will provide the requisite amount of the polyethylene alkane while with propane and butane the percentage of these hydrocarbons can be reduced to between about 2% and about 20% of the ethylene. It is quite evident accordingly that propane and butane are superior to methane and ethane with respect to the amount of the hydrocarbon needed tto give the desired amount of the substituted alkane and that as the molecular weight of the alkane is increased its concentration can be decreased to give the desired composite polymer. Since, however, only a portion of the alkane appears in the final product, that uncombined must be removed from the reaction and also from the polymeric product. Butane, because of its low volatility, is difficult to remove from the composite polymer. Propane can be more easily removed. The preferred alkane is, therefore, propane because of the small amount that is needed and because of the ease with which the unused propane can be removed from the composite polymer. Polymers having the desired improved film processability, however, can be produced with any of the aforesaid hydrocarbons present, if present in the prescribed amounts.

The examples which follow illustrate preferred embodiments of the invention in which parts are by weight unless otherwise indicated.

*Example 1.*—Into a 1000 ml. stainless steel nitrogen filled rocker tube was added an oxygen-free solution of 210 ml. of purified benzene and 0.01 gram of t-butyl-p-hydroxyanisole. The tube was sealed, the nitrogen removed and 60 p.s.i. of propane (6.9 g.) added at room temperature. The tube was then heated and ethylene was added until a temperature of 203° C. and a pressure of 925 atmospheres was attained (300 grams of ethylene were introduced). When this state was attained a solution of benzene containing 980 p.p.m. of di-t-butyl peroxide was injected into the benzene-ethylene mixture. The rocker tube was then maintained at a temperature of 203° C. for approximately 15 minutes during which the polymerization reaction occurred. The tube and contents were thereafter cooled to 70° C. and the contents removed. Polyethylene was produced in a yield of 27.5 grams (9% conversion). This polyethylene had a melt index of 2.20 and a propane to ethylene ratio of 2.27%. When the above reaction was conducted in the absence of propane, other conditions being substantially identical, a polymer was obtained having a melt index of 0.58.

*Example 2.*—The procedure of Example 1 was repeated using in place of propane the hydrocarbon gases, methane, ethane and isobutane. Table I describes the results of these runs.

*Table I*

| Hydrocarbon | | Solvent (ml.) | Bz/ Eth. | Initiator | Temp., ° C. | Press., Atms. | Time, Min. | Yield, g. | Melt Index |
|---|---|---|---|---|---|---|---|---|---|
| Added | Percent Based on $C_2H_4$ | | | | | | | | |
| (a) Methane | 13 | 210 Bz | 0.62 | (*) | 205 | 925 | 15 | 32.2 | 175 |
| (b) Ethane | 12 | 210 Bz | 0.62 | (*) | 205 | 925 | 15 | 24.8 | 120 |
| (c) Isobutane | 2 | 210 Bz | 0.62 | (*) | 205 | 925 | 15 | 37.3 | 150 |

*Di-t-butylperoxide.

*Example 3.*—The process of Example 1 was repeated using 32.9 mol percent of propane and 63.4 mol percent of ethylene. The reaction was conducted at a temperature of 160° C. and under a pressure of approximately 1450 atmospheres. After about 15 minutes the rocker tube was cooled and 9 grams of polymer was collected. This polymer was subjected to infrared analysis to determine the methyl group vibration in the 7.2–7.3 micron region. Using quantitative infrared techniques, based on the absorption intensity of the 7.25 micron methyl group band as compared with the known infrared spectrum of a hydrocarbon containing two methyl groups attached to the same carbon atom, the polymer was found to contain 3.1 methyl groups per 100 carbon atoms. The presence of two bands at 7.23 and 7.33 microns in the compensation spectra (solid and melt) of the polymer indicated the presence of isopropyl groups present to the extent of about 0.2 to 0.3 isopropyl groups per 100 carbon atoms. Infrared spectra at 8.55 and 10.9 microns confirmed the presence of isopropyl groups.

The data of Table II was obtained from runs in which ethylene, together with the indicated amount of propane, was fed into a tubular reaction zone of relatively great length to cross-section controlled throughout its length under the superatmospheres and the temperatures given in the table. The ethylene-propane gaseous mixture was fed to the reaction zone at the lower temperature and the products discharged from that zone at the higher temperature specified. The catalyst was introduced into the ethylene-propane feed, after the feed had been preheated to approximately the temperature it was introduced into the reaction zone.

*Table II*

| Example | 4 | 5 | 6 | 7 |
|---|---|---|---|---|
| Ethylene, pts. by wt | 95.1 | 95.3 | 100 | 100 |
| Propane, pts. by wt | 4.9 | 4.7 | 0 | 0 |
| Temperature, ° C | 168–208 | 186–209 | 200–250 | 194–259 |
| Pressure, p.s.i | 22,000 | 21,000 | 21,000 | 21,000 |
| Catalyst, p.p.m.[1] | X<br>350 | X<br>310 | Y<br>450 | Y<br>450 |
| Conversion, percent | 34 | 33.5 | 38 | 38 |
| Density | .9234 | .9229 | .9135 | .9140 |
| Yield point, p.s.i | 1,630 | 1,530 | 1,185 | 1,200 |
| Tensile | 1,850 | 1,690 | 1,680 | 1,680 |
| Elongation | 650 | 650 | 680 | 680 |
| Stiffness | 33,750 | 33,000 | 17,800 | 17,000 |
| Monofilament draw[2] | 96 | 72 | 38 | 30.6 |
| Transparency | 250 | 367 | 17 | 10.9 |
| Monofilament instability | 150 | 120 | 430 | 660 |

X=Tertiary butyl peracetate.
Y=Diethyl peroxide.
[1] Based on ethylene.
[2] Feet per minute.

Monofilament draw rate is a firm measure of the processability of the polymers from ethylene. The values for monofilament draw rates given in Table II were obtained in this manner. The polymer under test was heated to a temperature of 225° C. and maintained at that temperature throughout the test. From the container holding the molten polymer, the polymer was forced through an orifice having an internal diameter of 82 mils. Force was applied to the molten polymer by means of a piston sufficient to deliver the polymer from the orifice at a constant rate of 2½ grams per minute. The extruded filament was picked up, passed over two idler rolls and wound up on a take-up reel, the reel being powered by a motor capable of winding up the filament at a rate of from 3 to 330 feet per minute. Initially with the delivery of the polymer at a rate of 2½ grams per minute, the filament was reeled up at a rate of 5 feet per minute. The r.p.m. of the take-up reel was then increased at a constant rate and the rate at which the filament broke was taken as the measure of the monofilament draw rate.

When processing ethylene in the presence of an alkane in accord with the invention, it is not only possible under the prescribed conditions to control the final properties of the polymer within narrow limits but also possible to operate in such a manner that a composite polymer is produced having superior density, stiffness, yield point, film and filament draw, film transparency and tensile strength. The consequent advantage of the product is not only improved physical and chemical properties but also in uniformity of the product which can be easily duplicated.

Any suitable type of free radial producing catalyst of the art may be used for the reaction, examples of which are the peroxides, such as hydrogen peroxide, persuccinic acid, lauryl peroxide, diethyl peroxide and the like, as well as the azo catalysts of the Hunt U.S. Patent 2,471,959, issued May 31, 1949, and the other known free radical producing catalysts of the art.

For maximum extrudability and processability ethylene polymers should not have extremely high molecular weights for as the molecular weight increases the flowability or extrudability of the polymer decreases. When the homopolymers of ethylene are produced under normal pressure and temperature conditions, they do not possess optimum properties for use in the industries which desire to extrude polyethylene at high rates. By the process of the invention polymers of superior transparency and having higher rates of extrudability are obtained which rates are attributable primarily to the presence of the alkane during the polymerization of ethylene. The presence of the alkane lowers the molecular weight of the composite composition while improving many of the other properties desired by the molding and extruding industries.

The composite polymers of the invention have many uses other than those for which they are particularly adapted, viz., in the extrusion of the polymers to form films, supported and unsupported, in the coating of wire and other material. They may, for example, be used in the molding arts where improved stiffness is required and likewise in those arts that require a high degree of transparency together with high stiffness and tensile strength.

We claim:

1. In a process for the preparation of a mixture of normally solid polymers of ethylene possessing improved processability, density, stiffness, yield point, and tear strength, and containing a homopolymer of ethylene and from 10 to about 90% by weight of a 2-polyethylene propane, having a monofilament draw rate of at least 50 feet per minute, the step which comprises heating ethylene to a temperature between 140° C. and 250° C. and under a pressure between 800 and 2,000 atmospheres in the presence of a free radical-producing ethylene polymerization catalyst and from 2 to 20% by weight of propane based on the ethylene.

2. In a process for the preparation of a mixture of normally solid polymers of ethylene possessing improved processability, density, stiffness, yield point, and tear strength, and containing a homopolymer of ethylene and from 10 to about 90% by weight of a 2-polyethylene butane, having a monofilament draw rate of at least 50 feet per minute, the step which comprises heating ethylene to a temperature between 140° C. and 250° C. and under a pressure between 800 and 2,000 atmospheres in the presence of a free radical-producing ethylene polymerization catalyst and from 2 to 20% by weight of butane based on the ethylene.

3. In a process for the preparation of a mixture of normally solid polymers of ethylene possessing improved processability, density, stiffness, yield point, and tear strength, and containing a homopolymer of ethylene and from 10 to about 90% by weight of 2-polyethylene propane, having a monofilament draw rate of at least 50 feet per minute, the step which comprises heating a gaseous mixture containing about 95 parts by weight of ethylene and about 5 parts by weight of propane to a temperature between 168° C. and 208° C. under a pressure of approximately 1,400 atmospheres in the presence of an azo catalyst.

4. In a process for the preparation of a normally solid polymer of ethylene with improved processability, the steps which comprise polymerizing ethylene to polymers possessing increased processability, density, stiffness, yield point, and tear strength, at a temperature between 140° C. and 250° C. and under a pressure between 800 and 2,000 atmospheres in the presence of a free radical-producing catalyst and improving the processability of the polymer produced by conducting the polymerization in the presence of an alkane of the group consisting of ethane, propane and butane, present, respectively, to the extent of from 6 to 40%, 2 to 20%, and 2 to 20%, based on the weight of ethylene.

5. The products produced in accord with the process of claim 4.

6. In a process for the preparation of a mixture of normally solid polymers of ethylene possessing increased processability, density, stiffness, yield point, and tear strength, the step which comprises heating ethylene to a temperature between 140° C. and 250° C. and under a pressure between 800 and 2,000 atmospheres in the presence of a free radical-producing ethylene polymerization catalyst and from 6 to 40% by weight of ethane based on the ethylene.

References Cited in the file of this patent

UNITED STATES PATENTS

| | | |
|---|---|---|
| 2,377,779 | Hanford | June 5, 1945 |
| 2,450,451 | Schmerling | Oct. 5, 1948 |
| 2,475,648 | Stoner | July 12, 1949 |
| 2,482,877 | Schmerling | Sept. 27, 1949 |
| 2,606,179 | Boyd | Aug. 5, 1952 |
| 2,658,059 | Peters et al. | Nov. 3, 1953 |
| 2,699,457 | Ziegler | Jan. 11, 1955 |
| 2,731,452 | Field et al. | Jan. 17, 1956 |

UNITED STATES PATENT OFFICE

CERTIFICATE OF CORRECTION

Patent No. 2,932,632 April 12, 1960

Arthur W. Barry et al.

It is hereby certified that error appears in the printed specification of the above numbered patent requiring correction and that the said Letters Patent should read as corrected below.

Column 2, line 44, after "lower-" insert -- ing the homopolymerization temperatures it would be pos- --.

Signed and sealed this 31st day of January 1961.

(SEAL)
Attest:

KARL H. AXLINE
Attesting Officer

ROBERT C. WATSON
Commissioner of Patents